Nov. 7, 1967  YAO-TZU LI  3,350,936
MASS FLOW METER

Filed Dec. 30, 1964  2 Sheets-Sheet 1

$F = 2v\omega\rho A(r_1 - r_2)$ $a_c = 2v\omega$

INVENTOR.
YAO TZU LI
BY
ATTORNEYS

Nov. 7, 1967   YAO-TZU LI   3,350,936
MASS FLOW METER
Filed Dec. 30, 1964   2 Sheets-Sheet 2

INVENTOR
YAO TZU LI
BY
ATTORNEYS

United States Patent Office 3,350,936
Patented Nov. 7, 1967

3,350,936
MASS FLOW METER
Yao-Tzu Li, Huckleberry Hill, R.F.D. 1,
South Lincoln, Mass. 01773
Filed Dec. 30, 1964, Ser. No. 422,243
4 Claims. (Cl. 73—194)

The present invention relates to flow measuring apparatus and more particularly to apparatus for measuring the mass rate of flow of a liquid.

Conventional devices for measuring fluid flows measure the velocity of the fluid indirectly, by detecting a pressure or pressure differential associated with a moving liquid. However, such an indirect measurement has certain disadvantages, the primary one being that to obtain the desired figure of mass flow per unit time the pressure measurement must be corrected by the density. With solutions of different densities, and particularly for inhomogenous fluids, the correction can be extremely difficult. Other corrections must be utilized to account for variations in viscosity and basic pressure of the fluid.

My Patent No. 2,934,951 describes a mass flow meter which gives directly a true reading of mass flow and thus eliminates many of the above disadvantages. However, some problems remain even with that improved system, particularly with respect to measurement under extreme temperature variations. Furthermore, many modern systems in which the data flow is transmitted in the form of digital information. Similarly, many of the present day uses of mass flow meters are in complex servo systems. Thus, while the mass flow meter of my Patent No. 2,934,-951 offers significant advances in the flow meter art, still more improvement is desirable to meet some of the special requirements of the present space age technology. For example, in rocket fuel systems the mass flow rate being measured may be that of inhomogeneous cryogenic materials.

The prior art mass flow meters normally do not furnish an output which may be readily integrated to give total mass flow over a given interval. In many modern systems it is desirable to know not merely the instantaneous mass rate flow, but the integrated total of the mass rate flow subsequent to some specific point earlier in time.

Therefore it is an object of the present invention to provide a mass flow measuring device which gives the mass flow per unit time in digital form.

It is another object to provide a mass flow meter which may be used to measure flows of fluids at extremely low temperatures.

It is another object to provide a mass rate flow meter whose accuracy is substantially unaffected by temperature variations.

It is a further object to provide a mass rate flow meter suitable for direct incorpoartion in digital control and servo systems.

It is a still further object to provide a mass rate flow meter whose output is readily adapted to direct integration.

A principal feature of the present invention is the rotation of the fluid flow in such a way as to generate a Coriolis force, and the provision of means to balance the Coriolis force produced by this rotation, the balancing means providing the indication of mass rate flow. Another feature is the provision of quantized inputs of torque impulse to provide the balancing torque, these quantized inputs serving to provide an indication of mass rate flow in digital form. A further feature is the provision of a balancing force through the precessional torque of a gimbaled gyroscope.

The invention also involves the several features set forth in the following specification and drawings wherein.

Figure 1:
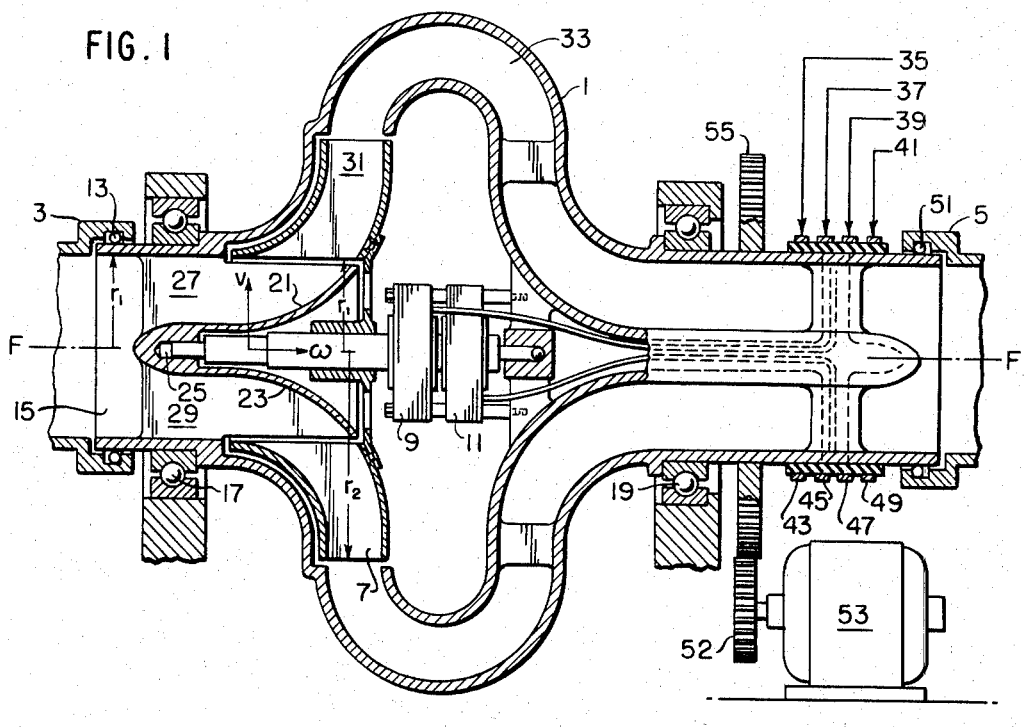
FIG. 1 is a cross-sectional view of a mass rate flow meter according to the present invention utilizing quantized torque inputs.

A preferred embodiment of the present invention is shown in FIG. 1. A rotatable member 1 is positioned between an inlet pipe 3 and an outlet pipe 5. All of these members are centered about an axis of flow F—F. A second member 7 in the path of fluid flow is contained within member 1. A microsyn assembly 9 senses the angular relationship of the member 7 with respect to the rotating member 1 along the axis F—F. A torquer 11 supplies impulses of torque to maintain this angular relationship at a constant value. The impulses of torque which must be supplied in any given time to balance the torque produced by the Coriolis acceleration of the fluid within the rotating guide member 7 serve as an indication of the mass rate flow.

In the specific embodiment of FIG. 1 the fluid enters from the left through inlet pipe 3. A rotary seal 13 provides a fluid type seal between the inlet pipe 3 and the inlet portion 15 of rotary member 1. This inlet portion 15 has a first radius $r_1$ which is the same as the radius of the inlet pipe 3 to provide a minimum flow disturbance. Bearings 17 and 19 permit the rotating chamber 1 to be rotated about the axis of flow F—F. The conical guide vanes 21 divert the incoming flow into the second member 7. The measuring member 7 has a shaft 23 journaled in bearing 25. This bearing 25 is supported by a plurality of guide vanes 27 and which extend axially and radially within rotating member 1.

The measuring member 7 has an inlet radius $r_1$ equal to the diameter of the inlet portion 15 of the rotating guide member 1. In order that each entering particle may be at the same radius when it enters the measuring rotor 7, the rotor is configured with a constant inlet radius $r_1$. Thus, no matter what the distribution of an inhomogeneous fluid, each particle enters at the same radius and thus no errors are introduced through changes in fluid distribution. The plurality of guide vanes 27 impart the same angular velocity to all of the particles leaving the inlet portion 15. With a constant radius and constant angular velocity, all particles have the same tangential velocity.

The measuring rotor 7 has a plurality of radial vanes 31 which insure that all of the particles at a given radial distance from the axis of flow F—F have the same angular velocity with respect to the axis. The outlet portion of the measuring member 7 has a constant radius $r_2$. Again a constant radius and uniform angular velocity all elements of flow have identical tangential velocity. The fluid discharges from the measuring rotor 7 into the outlet portion 33 of the rotating guide chamber, the guide chamber serving to redirect the fluid to axial flow along axis F—F.

The leads 35 and 37 and 39 and 41 for the microsyn 9 and the microsyn torquer 11 respectively are applied to slip rings 43 and 45 and 47 and 49 respectively. Rotary seal 51 assures a fluid tight coupling to the outlet pipe 5. A motor 53 drives a gear 55 affixed to rotary guide chamber 1 through its associated gear 57.

Figure 2:
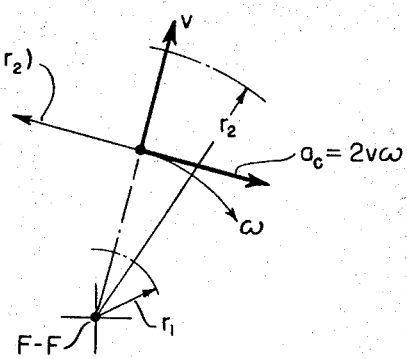
FIG. 2 is a schematic drawing showing the generation and balancing of the Coriolis force.

Referring now to FIG. 2, the generation of the Coriolis force is shown in schematic form. This force is discussed in my above-mentioned Patent No. 2,934,951. The angular velocity of the rotary members is shown vectorially by the vector omega in FIGURE 1 and is represented by the arc omega in FIGURE 2. Every particle of fluid in the meaurement rotor 7 undergoes a Coriolis acceleration $a_c$ which is in a direction perpendicular to both the angular velocity vector omega and the radial velocity vector $v$. The magnitude of this acceleration is given by the following equation:

$$a_c = 2v\omega \tag{1}$$

The Coriolis force acting on the measuring rotor is found by integrating from the inner radius to the outer radius the force necessary to produce the above acceleration. This force is given by the following equation where F is the Coriolis force, $\delta$ is the density of the fluid, A is the cross-sectional area and $dr$ is the incremental radius of producing the incremental force:

$$dF = 2v\omega\delta A\, dr \tag{2}$$

The torque is this force times the radius at which the force is produced. Integrating produces the following relationship for the total torque:

$$\tau_f = \omega(r_2^2 - r_1^2)\overline{W} \tag{3}$$

in which:

$\tau_f$ is the torque due to the Coriolis acceleration of the fluid, $\omega$ equals the speed of rotation of the assembly 1, $r_2^2$ and $r_1^2$ are the outer and inner radii respectively of the measuring rotor 7, and $\overline{W}$ is the mass flow rate.

If the torquer 11 supplies a torque input $\tau_t$ and the angular displacement between the rotor 7 and member 1 is maintained constant, that is, the torque due to the Coriolis effect is exactly equaled to the balancing torque from the torquer 11, then the following equation will apply:

$$\tau_f = \tau_t \tag{4}$$

Solving for $\overline{W}$:

$$\overline{W} = \frac{\tau_t}{\omega(r_2^2 - r_1^2)} \tag{5}$$

Figure 3:
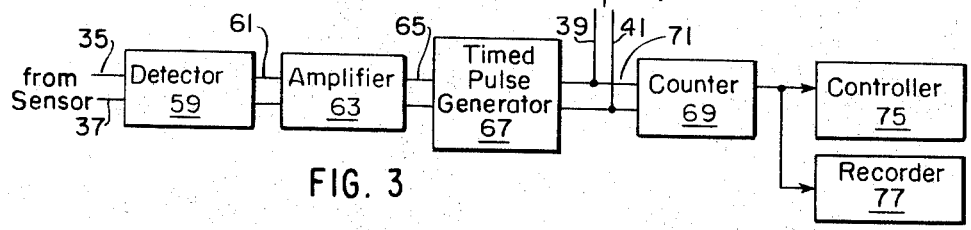
FIG. 3 is a block diagram showing the associated circuitry for the embodiment of FIG. 1.

Referring now to FIGURE 3, a block diagram of circuitry appropriate to permit operation with the apparatus of FIGURE 1 is set forth. The lines 35 and 37 from the microsyn sensor 9 supply inputs to the detector 59. The output from detector 59 is fed to amplifier 61. The output from detector 59 is fed through lines 61 to amplifier 63. The output from amplifier 63 is fed over lines 65 as the input to timed pulse generator 67. The output from timed pulse generator 67 is fed to counter 69 over line pair 71 and to the microsyn torquer 11 over lines 39 and 41. If the counter 69 is provided with an output dial or indicator device showing the counts per unit time these counts will be proportional to the balancing torque applied through the torquer 11 to maintain equilibrium and will indicate the mass rate flow.

The overall operation of the apparatus of FIGURE 1 is thus as follows; the incoming fluid passes from the inlet pipe 3 to the inlet portion 15 of rotating guide chamber 1 and thence into the measuring impeller 7. The motor 53 causes the rotating element 1 and the impeller 7 to rotate. Rotation of the measuring impeller 7 rotates the fluid which is moving through the impeller on a path of increasing radius from the axis F—F. This rotation creates a Coriolis force which produces a torque which tends to deflect the element 7 with respect to the element 1. This change in the angular relationship between guide chamber 1 and impeller 7 with respect to the axis F results in the production of a signal by the microsyn 9 which is connected to elements 1 and 7 and serves to make an angular measurement. The microsyn output is detected in detector 59 and amplified in amplifier 63. When the value exceeds a predetermined level the timed pulse generator 67 sends an energizing pulse to the torquer 11. This pulse provides an increment of torque to the element 7 with respect to the chamber 1. Additional torque pulses are applied until a constant angular relationship is maintained between rotary elements 7 and 1. At that equilibrium condition the torque applied to the rotor 7 by the Coriolis acceleration is exactly equal to the torque applied to this series of torque pulses from the torquer 11. Since each pulse is of a predetermined magnitude the number of pulses per unit time is a measure of the torque applied. Thus this number pulses per unit time provides a digital measurement of torque. As shown in FIGURE 3, the counter thus provides an output on line 73 which may be fed to digital control devices 75 or recording devices 77.

Figure 4:
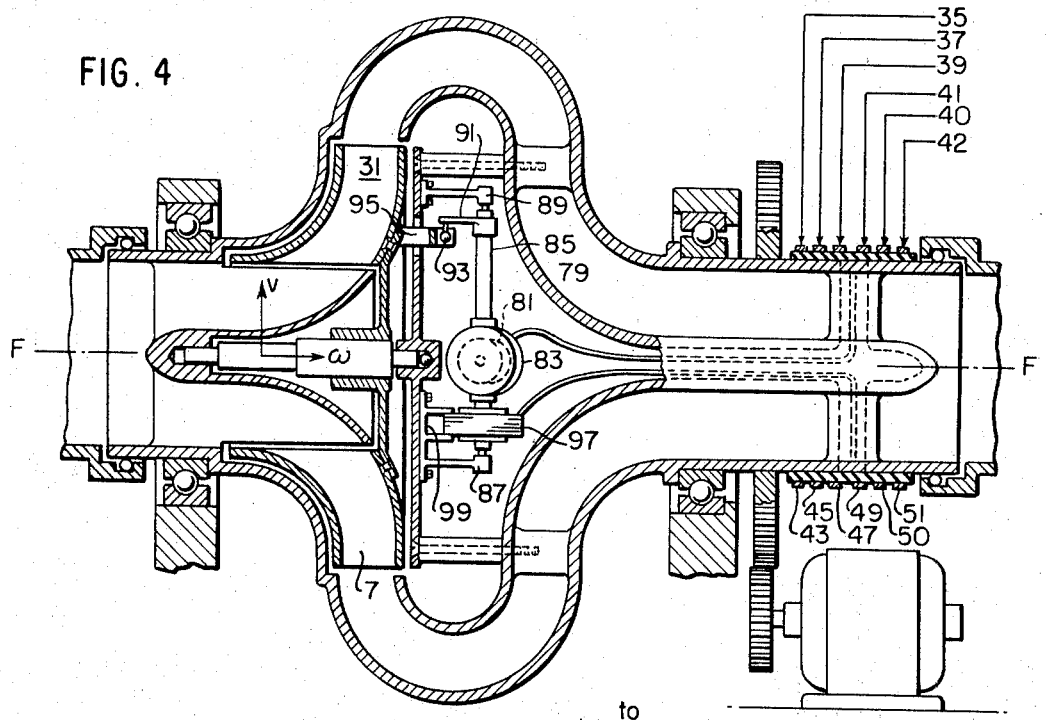
FIG. 4 is a cross-section view of an embodiment of the present invention employing a gyroscope to balance the Coriolis force.

Referring now to FIGURE 4, an embodiment of the present invention employing a gyroscope to provide a balancing torque is shown. With the exception of the gyroscope torque balancing means, the structure is substantially identical to that of FIGURE 1 and the operation is as described above in connection with FIGURE 1. In the embodiment of FIGURE 1 the balancing torque was supplied by means of torque pulses from the torquer 11. In the structure of FIGURE 4, a gyroscope assembly 79 serves to provide the balancing torque. The gyro assembly includes a rotating mass 81 gimbaled in a support housing 83. The housing 83 is mounted on a shaft 85, pivoted in bearings 87 and 89. An arm 91 on shaft 85 has a ball 93 which engages a yoke 95 affixed to the rotating impeller 7.

A microsyn 97 is also attached to shaft 85 and coupled with gear segment 99 affixed to rotating impeller 7; leads 35 and 37 to microsyn 97 through slip rings 43 and 45 to provide angular position information in a manner like that of FIGURE 1.

Leads 39 and 41 go to the gyroscope housing 83 through slip rings 47 and 49 and provide the energization for the gyroscope motor windings of the housing 83. Two additional slip rings 50 and 51 with their associated leads 40 and 42 respectively are provided for embodiments which sense the speed of the gyro rotor directly.

Figure 5:
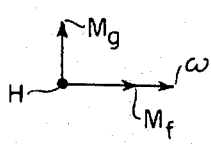
FIG. 5 is a vector diagram showing the torque relationship of the embodiment of FIG. 4.

FIGURE 5 shows the torque relationship of the gyroscope embodiment in vectorial form. Angular speed of the case $\omega$ and the moment of flow $m_f$ are parallel vectors lying along the axis of flow F—F. The precessional moment $m_g$ is a vector perpendicular to the $\omega$ vector. The moment H of the gyro rotor itself is shown as a dot since it is a vector perpendicular to the plane defined by the vectors previously mentioned.

The mode of operation of these gyroscope torque balancing elements is as follows. The torque produced by the Coriolis effect is as set forth above in Equation 3, $\tau_f = \omega(r_2^2 - r_1^2)\overline{W}$. The precessional to torque produced by the gyroscope as the result of its rotation about axis F—F may be represented by a vector $\tau_G$ lying along the axis of shaft 85. This precessional torque is given by the following equation:

$$\tau_G = \omega\theta I \tag{6}$$

where $\tau_G$ = the precessional torque of the gyroscope, $\omega$ equals the speed at which the rotating housing 1, to which the gyroscope is affixed, is rotating about axis F—F, $\theta$ equals the rotational velocity of the gyroscope rotor and, I equals the gyroscope angular moment of inertia.

The above described coupling introduces a linkage ratio which may be represented by K. In equilibrium the following equation holds:

$$\tau_f = -K \tag{7}$$

therefore, $$\omega(r_2^2 - r_1^2)\overline{W} = K\omega\theta \quad (8)$$

Thus, for the mass rate flow:

$$\overline{W} = \frac{\theta KI}{(r_2^2 - r_1^2)} \quad (9)$$

In other words, in the equilibrium condition the mass rate flow is equal to constant, predetermined parameters of the structure times the rotational velocity of the gyroscope rotor. Thus, the gyroscope rotor angular velocity at an equilibrium condition serves as an indication of the mass rate flow.

Figure 6:
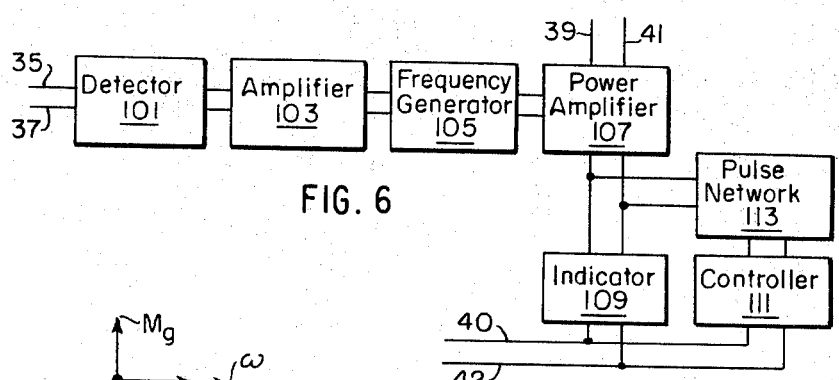
FIG. 6 is a block diagram of the circuitry associated with the apparatus of FIG. 4.

The system of FIGURE 4 may be utilized with the circiutry shown in FIGURE 6. The lines 35 and 37 from the sensing microsyn go to a detector 101. The output from this detector is amplified in amplifier 103 to determine whether the gyro rotor speed should be changed. The output from amplifier 103 is fed to a frequency generator 105 which controls a power amplifier 107. The output from power amplifier 107 is fed through lines 39 and 41 to the gyro motor. An indicator 109 coupled to the power amplifier 107 indicates the frequency being applied to the gyro motor. Since the frequency output from frequency generator 105 is also identical that element could be used as the input to the indicator or control apparatus.

If a synchronous motor is used for the gyroscope, the frequency indication will be an indication of the gyroscope angular velocity and thus through Equation 9 above will indicate, when calibrated, the mass rate flow. The frequency may also be fed to control apparatus 111 to incorporate the mass flow meter into an overall control system. In the embodiment shown the coupling to control 111 is through a pulse forming network 113 which produces one pulse for each cycle of the energization power and thus permits convenient digital operation.

If the additional leads 40 and 42 are provided in the embodiment of FIG. 4, the gyroscope rotor speed may be sensed directly. In that case a direct input to the indicator 109 and control 111 of FIG. 6 is provided over lines 40 and 42. With such an embodiment the gyroscope rotor does not need to be driven by a synchronous motor and any convenient drive arrangement can be used, since the actual speed of rotation will be sensed. If one of the conventional line sharing techniques is used so that the same channel is used to transmit both power and informative, or more than one flow of information, it is not necessary to provide all of the leads shown. However, independent leads have been shown in the drawings to simplify the description. The sharing of information and power channels is extensively treated in the technical lierature and will not be described here.

It will be noted that in the embodiments of both FIGURES 1 and 4 the torque balancing arrangement is unaffected by changes in temperature. In the case of the embodiment of FIG. 1, the torque balancing is derived fundamentally by magnetic fields which are not temperature dependent. In the embodiment of FIG. 4 the balancing is provided by gyroscopic forces which depend basically upon the mass of the rotating body, and the mass is unaffected by temperature. Therefore these embodiments are suitable for use over extreme temperature variations without degradation of the accuracy of measurement.

Although a single gyroscope has been used in embodiment of FIG. 4 for simplicity in the drawings and description, it is possible to use two gyroscopes to provide the balancing. One convenient way to utilize two gyroscopes would be to utilize both upstream and downstream rotors as discussed below, and couple the two gyroscopes together. The output of one gyroscope would be applied to balance one rotor and the output of the other gyroscope would be applied to the other rotor.

While the above description has been based primarily upon instantaneous measurement and indication, in many cases an integrated measurement is desirable. In that case the embodiments and the circuitry of FIGURES 3 and 6 is readily adapted to provide, by conventional electronic techniques, either the rate of mass flow, or that rate integrated over any desired interval of time.

In the above embodiments the impeller contained within rotating housing 1 has been placed in the inlet side of that housing. If additional torque were desired an additional rotor could be used downstream in an identical fashion, except for the sign of the values involved in the analogous downstream portion. However, since the bearings supporting the impeller and the impeller itself are turning at the same speed there is no need for this additional impeller to balance frictional or other errors. The single impeller can be placed either upstream or downstream as desired. The incoming flow may in certain applications, be from an annular pipe. In such cases a device corresponding to the left hand portion of the apparatus of either FIGURE 1 or FIGURE 4 may be used. Since the flow direction will be opposite, that is, outward-in rather than inward-out, the algebraic signs will be different, but the operation will otherwise be identical. Various other modifications will suggest themselves to those skilled in the art, and may be made without departing from the scope of the present invention.

Having thus described my invention, I claim:

1. A mass flow meter comprising a first member rotatable about a first axis, said first member having inlet and outlet portions, a second member positioned within said first member, said second member having inlet and outlet portions, said second member being free to rotate with respect to said first member about said axis, said second member being positioned within the flow path so that flow from the inlet portion of said first member passes through said second member before passing through the outlet portion of said first member, the inlet portion of said second member having a first mean radius with respect to said first axis, the outlet portion of said second member having a second mean radius with respect to said first axis, said first and second mean radii having different values, means to rotate said first member, the Coriolis effect produced by the mass flow through said second member producing an angular displacement between said first and second members, means to sense the angular relationship between said first and second members with respect to said first axis, a gyroscope attached through gimbals to said first rotatable member, said gyroscope having a second axis of rotation, rotation of said first member causing said gyroscope to produce a precessional torque, said precessional torque being perpendicular to a plane including said first and second axes, means to apply said precessional torque to said second member to maintain said angular relationship at a constant value, the torque so applied serving as an indication of the mass rate flow.

2. A mass flow meter comprising a first member rotatable about the first axis, said first member having inlet and outlet portions, a second member positioned within said first member, said second member having inlet and outlet portions, the inlet portion of said second member having a first mean radius with respect to said first axis, the outlet portion of said second member having a second mean radius with respect to said first axis, said first and second mean radii having different values, first guide means within the inlet portion of said first member, said first guide means serving to impart a uniform angular velocity to fluid particles leaving said inlet portion, second guide means positioned within said second member, said second guide means serving to impart a uniform angular velocity to fluid particles leaving said second member, means to sense the angular relationship between said first and second members with respect to said first axis, a gyroscope attached through gimbals to said first rotatable member, said gyroscope having a second axis of rotation, rotation of said first member causing said gyroscope to produce a precessional torque, said precessional torque being perpendicular to a plane including said first and second axes, and means to apply said precessional torque to said second member to maintain said angular relationship at a constant value, the torque so applied serving as an indication of the mass rate flow.

3. A mass flow meter comprising a first member rotatable about a first axis, said first member having inlet and outlet portions, a second member positioned within said first member, said second member having inlet and outlet portions, the inlet portion of said second member having a first mean radius with respect to said first axis, the outlet portion of said second member having a second mean radius with respect to said first axis, said first and second mean radii having different values, means to sense the angular relationship between said first and second members with respect to said first axis, a gyroscope attached through gimbals to said first rotatable member, said gyroscope including a rotating mass, said rotating mass rotating about a second axis, rotation of said mass causing said gyroscope to produce a precessional torque, said precessional torque being perpendicular to a plane including said first and second axis, means to vary the speed of rotation of said mass to produce a corresponding variation in said precessional torque and means to apply said precessional torque to said second member to maintain said angular relationship at a constant value, the speed necessary to maintain said angular relationship at a constant value serving as an indication of the mass rate flow.

4. A mass flow meter comprising a first member rotatable about a first axis, said first member having inlet and outlet portions, a second member positioned within said first member, said second member having inlet and outlet portions, the inlet portion of said second member having a first mean radius with respect to said first axis, the outlet portion of said second member having a second mean radius with respect to said first axis, said first and second mean radii having different values, first guide means within the inlet portion of said first member, said first guide means serving to impart a uniform angular velocity to fluid particles leaving said inlet portion, second guide means positioned within said second member, said second guide means serving to impart a uniform angular velocity to fluid particles leaving said second member, means to sense the angular relationship between said first and second members with respect to said first axis, a gyroscope attached through gimbals to said first rotatable member, said gyroscope including a rotating mass, said rotating mass rotating about a second axis, rotation of said mass causing said gyroscope to produce a precessional torque, said precessional torque being perpendicular to a plane including said first and second axis, means to vary the speed of rotation of said mass to produce a corresponding variation in said precessional torque and means to apply said precessional torque to said second member to maintain said angular relationship at a constant value, the speed necessary to maintain said angular relationship at a constant value serving as an indication of the mass rate flow.

References Cited
UNITED STATES PATENTS

| | | | |
|---|---|---|---|
| 2,832,218 | 4/1958 | White | 73—194 |
| 2,877,649 | 3/1959 | Powers | 73—194 |
| 2,975,634 | 3/1961 | Rose | 73—194 |
| 3,049,917 | 8/1962 | Alspach et al. | 73—194 |
| 3,131,564 | 5/1964 | Romberg | 73—517 |
| 3,204,466 | 9/1965 | Henderson | 73—517 |

JAMES J. GILL, *Primary Examiner.*

RICHARD C. QUEISSER, *Examiner.*

E. D. GILHOOLY, *Assistant Examiner.*